United States Patent
Malina et al.

(10) Patent No.: US 11,603,055 B2
(45) Date of Patent: Mar. 14, 2023

(54) LICENSE PLATE FRAMES INCLUDING IMPACT PROTECTION FEATURES

(71) Applicant: Keystone Global LLC, Congers, NY (US)

(72) Inventors: Eric Malina, Upper Saddle River, NJ (US); Ronny Malina, Brooklyn, NY (US)

(73) Assignee: KEYSTONE GLOBAL LLC, Congers, NY (US)

(*) Notice: Subject to any disclaimer, the term of this patent is extended or adjusted under 35 U.S.C. 154(b) by 0 days.

(21) Appl. No.: 17/206,093

(22) Filed: Mar. 18, 2021

(65) Prior Publication Data
US 2022/0297621 A1 Sep. 22, 2022

(51) Int. Cl.
*B60R 19/00* (2006.01)
*B60R 13/10* (2006.01)

(52) U.S. Cl.
CPC ............ *B60R 19/00* (2013.01); *B60R 13/105* (2013.01)

(58) Field of Classification Search
CPC ............................. B60R 13/105; B60R 19/50
See application file for complete search history.

(56) References Cited

U.S. PATENT DOCUMENTS

| | | | |
|---|---|---|---|
| 7,316,433 B2 * | 1/2008 | Levine | ................... B60R 13/10 293/142 |
| D617,259 S | 6/2010 | Malina et al. | |
| 7,740,294 B2 | 6/2010 | Malina et al. | |
| 7,866,715 B2 | 1/2011 | Malina et al. | |
| 8,047,601 B2 | 11/2011 | Malina et al. | |
| 8,393,658 B2 | 3/2013 | Malina et al. | |
| 8,850,727 B2 * | 10/2014 | Malina | .................. B60R 13/105 40/209 |
| D756,858 S | 5/2016 | Malina et al. | |
| D756,859 S | 5/2016 | Malina et al. | |
| D799,387 S | 10/2017 | Malina et al. | |
| D807,247 S | 1/2018 | Malina et al. | |
| D814,368 S | 4/2018 | Malina et al. | |
| 10,081,320 B2 | 9/2018 | Prevor et al. | |
| 2003/0196355 A1 * | 10/2003 | Castro | ................... B60R 13/105 40/209 |
| 2006/0156595 A1 * | 7/2006 | Kasak | .................. B60R 13/105 40/209 |
| 2010/0276951 A1 | 11/2010 | Malina et al. | |
| 2012/0013137 A1 * | 1/2012 | Rinklin | .................... B60R 19/50 293/155 |
| 2013/0047476 A1 * | 2/2013 | Malina | .................. B60R 13/105 248/475.1 |
| 2015/0135567 A1 * | 5/2015 | Malina | .................. B60R 13/105 40/209 |
| 2017/0355334 A1 * | 12/2017 | Prevor | .................. B60R 13/105 |

* cited by examiner

*Primary Examiner* — Gary C Hoge
(74) *Attorney, Agent, or Firm* — Faegre Drinker Biddle & Reath LLP

(57) ABSTRACT

A license plate frame includes a base portion and a perimeter portion. The base portion includes a plurality of fastener openings, and each of the plurality of fastener openings is configured to receive a fastener for securing the license plate frame and a license plate to a vehicle. The perimeter portion is connected to and extends outwardly from the base portion. The perimeter portion includes a plurality of walls, the plurality of walls includes a first wall, and the first wall includes at least one compression opening.

16 Claims, 6 Drawing Sheets

LICENSE PLATE FRAMES INCLUDING IMPACT PROTECTION FEATURES

CROSS REFERENCE TO RELATED APPLICATION

None.

FIELD OF THE DISCLOSURE

The present disclosure generally relates to frames for mounting license plates to vehicles. More specifically, the present disclosure relates to license plates frames that provide impact protection for license plates and vehicle bumpers.

BACKGROUND OF THE DISCLOSURE

License plate frames are commonly used to mount license plates to vehicles, more specifically to vehicle bumpers or a bracket mounted to the bumper. Such frames typically extend around the perimeter of license plates and thereby provide protection to the edges of license plates. However, such protection is typically minimal, and license plate frames typically do not protect the vehicle itself. For at least these reasons, there remains a desire for a license plate frame that not only acts to surround a license plate in an aesthetic manner, but also to provide improved protection to the vehicle to which the license plate is attached, particularly in the event of incidental contact with an outside force, such as from another vehicle.

SUMMARY OF THE INVENTION

In one aspect, the present disclosure provides a license plate frame including a base portion and a perimeter portion. The base portion includes a plurality of fastener openings, and each of the plurality of fastener openings is configured to receive a fastener for securing the license plate frame and a license plate to a vehicle. The perimeter portion is connected to and extends outwardly from the base portion. The perimeter portion includes a plurality of walls, the plurality of walls includes a first wall, and the first wall includes at least one compression opening.

In another aspect, the present disclosure provides a license plate frame including a base portion and a perimeter portion. The base portion includes a plurality of fastener openings, and each of the plurality of fastener openings is configured to receive a fastener for securing the license plate frame and a license plate to a vehicle. The perimeter portion is connected to and extends outwardly from the base portion, and the perimeter portion includes a plurality of walls. The plurality of walls includes a first sidewall including at least one first sidewall compression opening, a second sidewall including at least one second sidewall compression opening, a lower wall extending between the first sidewall and the second sidewall, and an upper wall extending between the first sidewall and the second sidewall.

BRIEF DESCRIPTION OF THE DRAWINGS

For illustrative purposes, the drawings show an embodiment which is presently preferred. However, it should be understood that the present disclosure is not limited to the embodiment illustrated in the drawings.

DETAILED DESCRIPTION OF THE DRAWINGS

Figure 1:
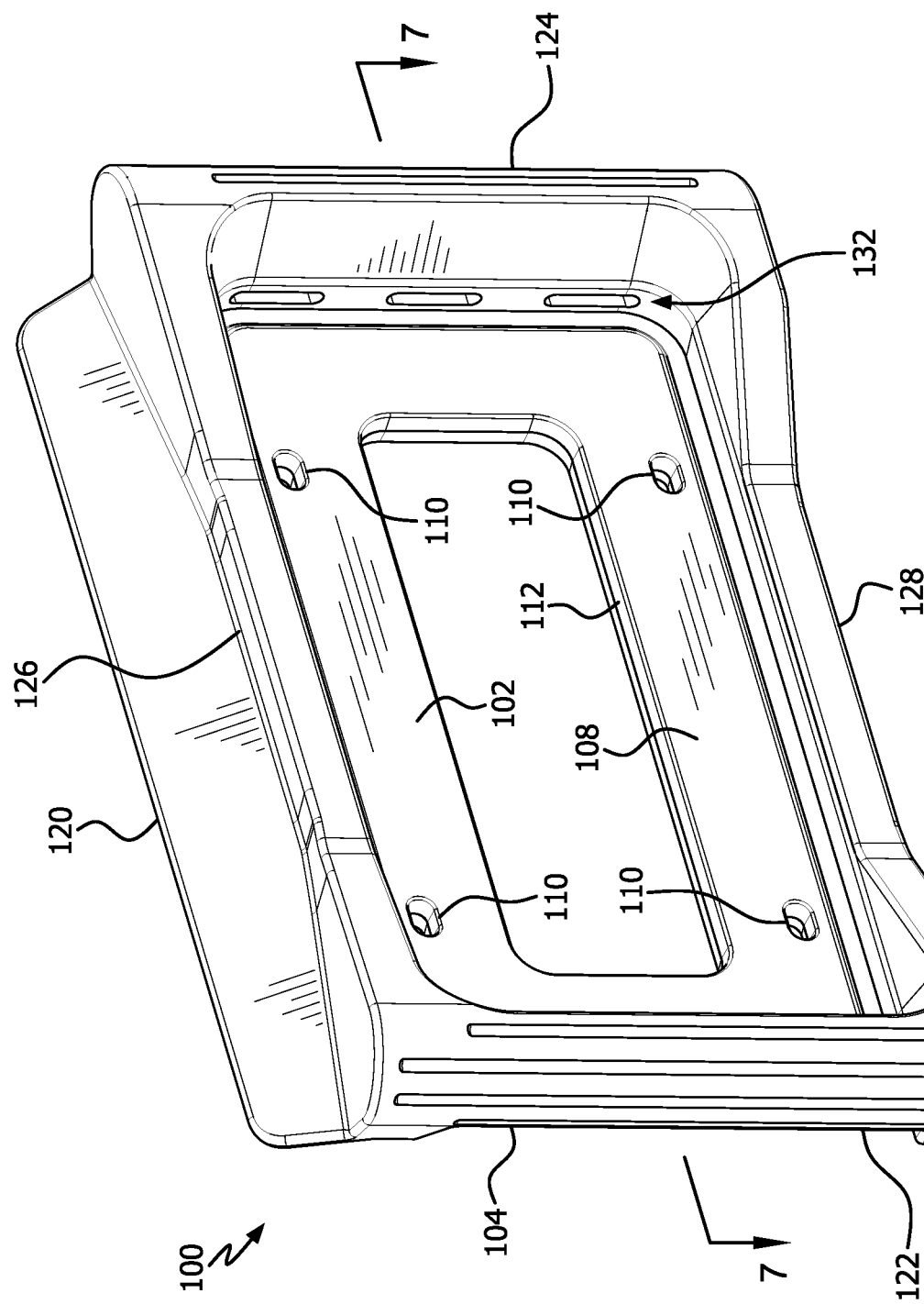
FIG. 1 is a front perspective view of a license plate frame according to an embodiment of the present disclosure.
Figure 2:
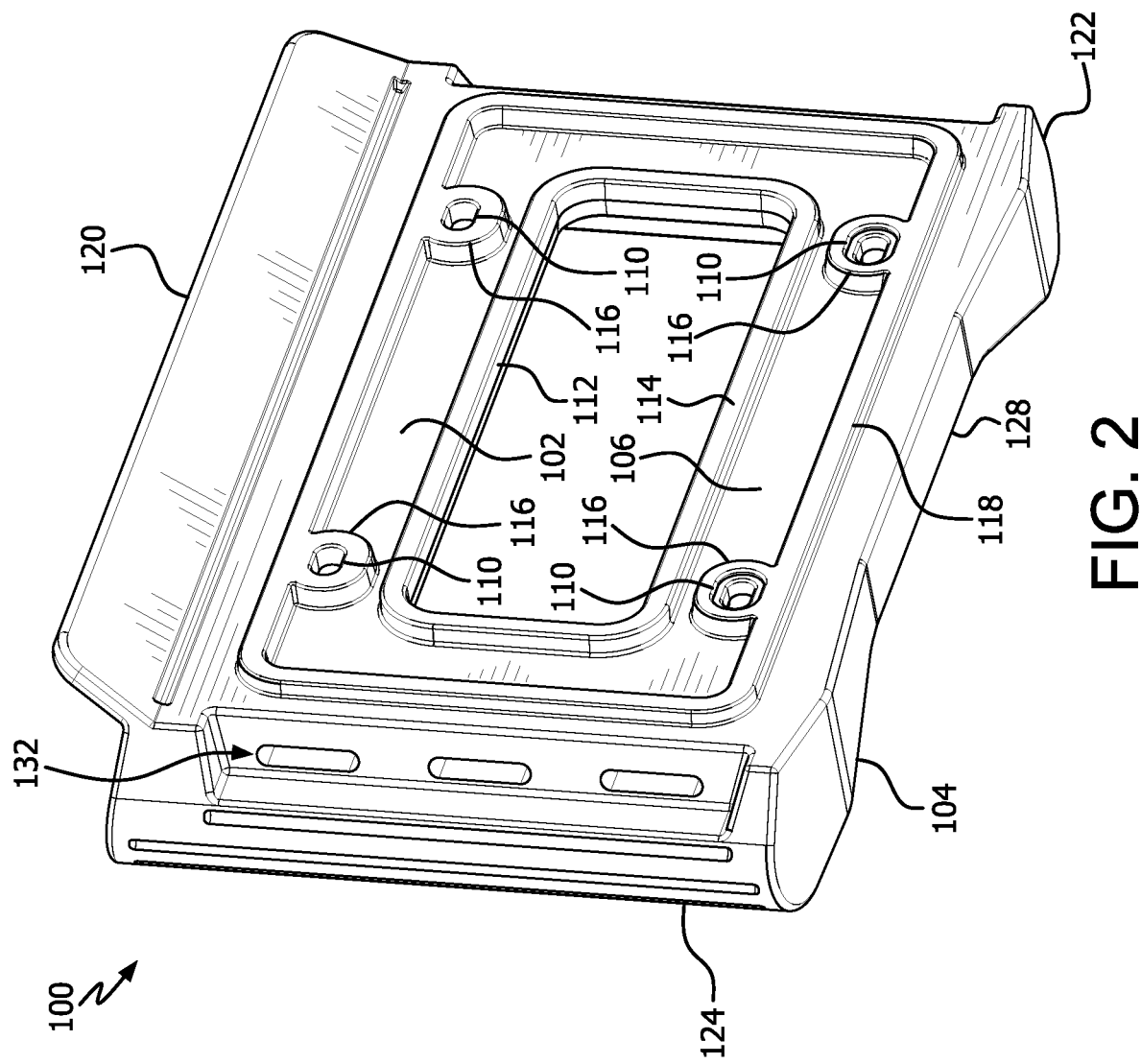
FIG. 2 is a rear perspective view of the license plate frame of FIG. 1.

Referring to the drawings, wherein like reference numerals identify corresponding or similar elements throughout the several views, FIGS. 1 and 2 illustrate a license plate frame 100 according to an embodiment of the present disclosure. Generally, the license plate frame 100 includes a base portion 102 and a perimeter portion 104 connected to and extending outwardly from the base portion 102. The base portion 102 includes a rear surface 106 (FIG. 2) configured to abut a vehicle (not shown—more specifically, a bumper of a vehicle, a bracket mounted to the bumper, or the like) and an opposite front surface 108 (FIG. 1) configured to be abutted by a license plate (not shown). The base portion 102 also includes a plurality of fastener openings 110 (illustratively, four fastener openings 110), and each fastener opening 110 receives a fastener (not shown) for securing the license plate frame 100 and the license plate to the vehicle. When secured to the vehicle and the license plate frame 100, the license plate is surrounded by the perimeter portion 104. As described in further detail below, the perimeter portion 104 includes features that permit the license plate frame 100 to act as a bumper capable of reducing the effect of impacts and potential damage to the vehicle to which it is attached. The license plate frame 100 thereby protects the license plate and the vehicle from damage by contacting other objects (for example, other vehicles, stationary objects, and the like).

The license plate frame 100 is illustrated as a monolithic component, although the license plate frame 100 may alternatively be formed by two or more components joined in various appropriate manners (for example, via fasteners, adhesives, welding, or the like). The license plate frame 100 may be constructed from a relatively rigid but somewhat compressible material, such as, vulcanized rubber, natural rubber, foam rubber, ethylene vinyl acetate (EVA) foam rubber, polyvinyl chloride (PVC), thermoplastic elastomers (TPEs), silicone, or any other flexible rubber. Alternatively, the license plate frame 100 may be constructed from other materials or combinations of other materials.

Figure 3:
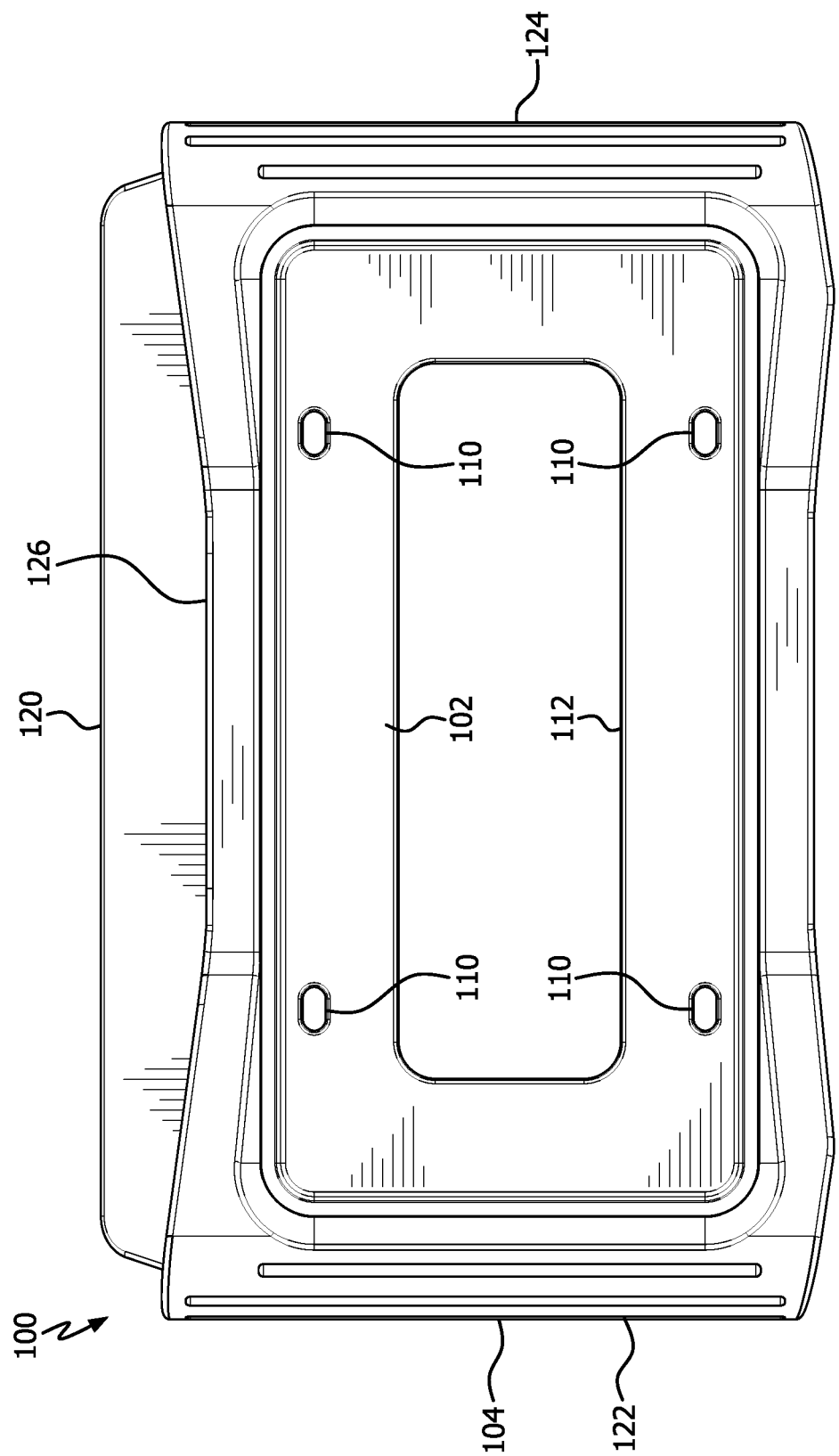
FIG. 3 is a front view of the license plate frame of FIG. 1.
Figure 4:
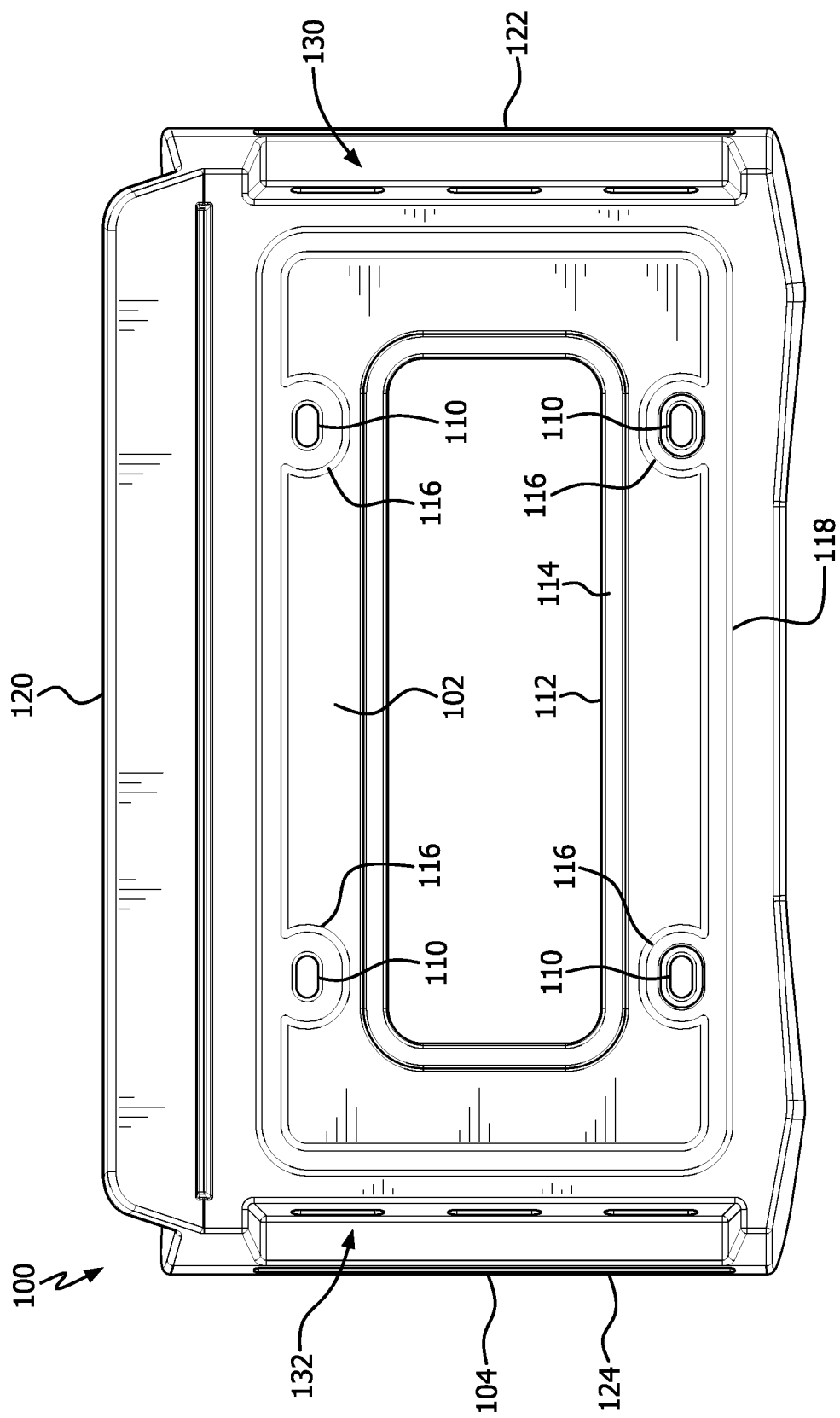
FIG. 4 is a rear view of the license plate frame of FIG. 1.

With continued reference to FIGS. 1 and 2 and additional reference to FIGS. 3 and 4, the base portion 102 includes a main opening 112 that provides the license plate frame 100 with a relatively low weight. Alternatively, the base portion 102 may include a plurality of main openings 112 or lack a main opening 112. The rear surface 106 of the base portion 102 illustratively includes one or more bosses. More specifically, the rear surface 106 includes a main boss 114 (FIGS. 2 and 4) that extends around the main opening 112, fastener bosses 116 (FIGS. 2 and 4) that extend around each of the fastener openings 110, and a perimeter boss 118 (FIGS. 2 and 4) that extends around and joins the fastener bosses 116. Alternatively, the rear surface 106 may lack one or more of the bosses 114, 116, 118. The base portion 102 also includes an upper fin 120 that extends diagonally away from the rear surface 106. Alternatively, the base portion 102 may lack the upper fin 120.

Figure 6:
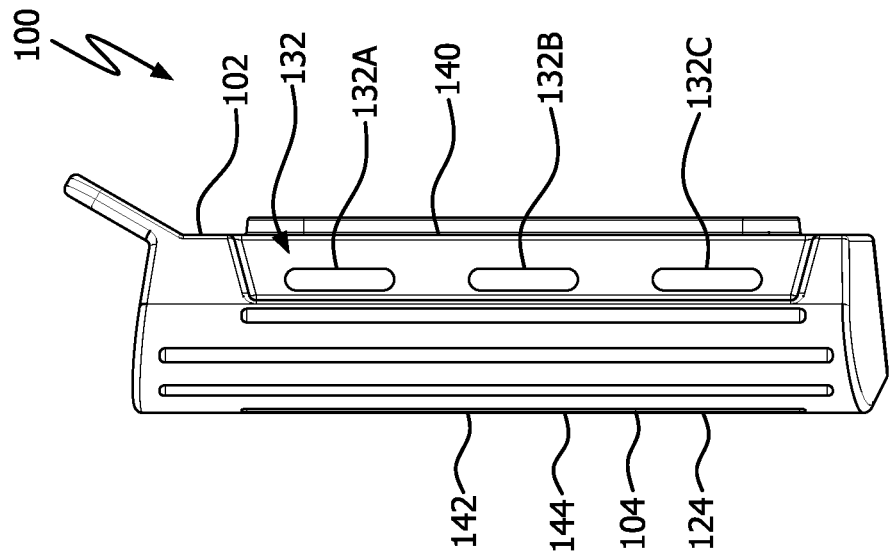
FIG. 6 is a right side view of the license plate frame of FIG. 1.
Figure 5:
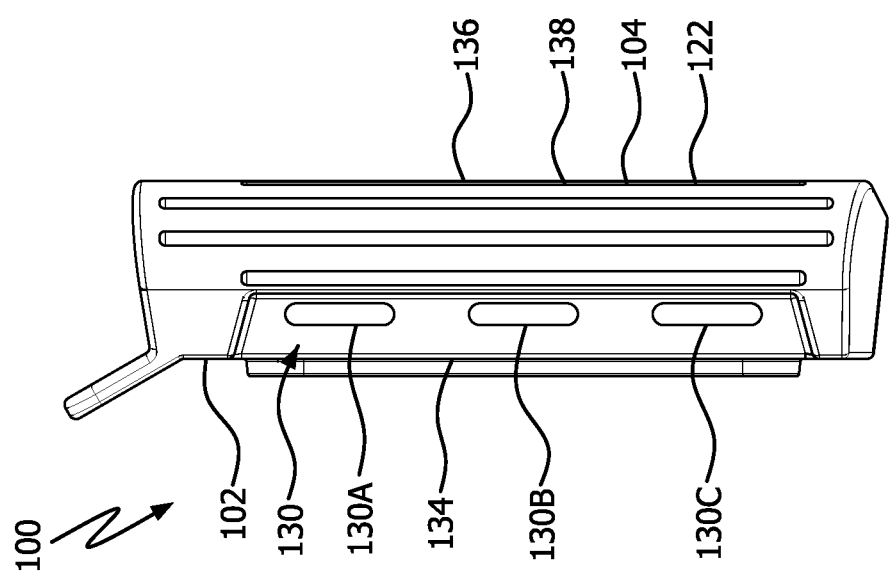
FIG. 5 is a left side view of the license plate frame of FIG. 1.

With continued reference to FIGS. 1-4 and additional reference to FIGS. 5 and 6, the perimeter portion 104 includes a plurality of walls, more specifically a first wall 122 (also referred to as a first sidewall or a left wall), a second wall 124 (also referred to as a second sidewall or a right wall), a third wall 126 (also referred to as an upper wall), and a fourth wall 128 (also referred to as a lower wall). The first wall 122 and the second wall 124 are disposed on opposite sides of the base portion 102, and the third wall 126 and the fourth wall 128 are disposed on opposite sides of the base portion 102 and extend between the first wall 122 and the second wall 124. The third wall 126 and the fourth wall 128 may taper toward the base portion 102 proceeding away from the first wall 122 and the second wall 124. As described in further detail below, the first wall 122 includes one or more compression openings 130 and the second wall 124 includes one or more compression openings 132 that facilitate deflection of the walls 122, 124 upon contact with other objects. That is, the compression openings 130, 132 permit the license plate frame 100 to act as a bumper.

Figure 7:
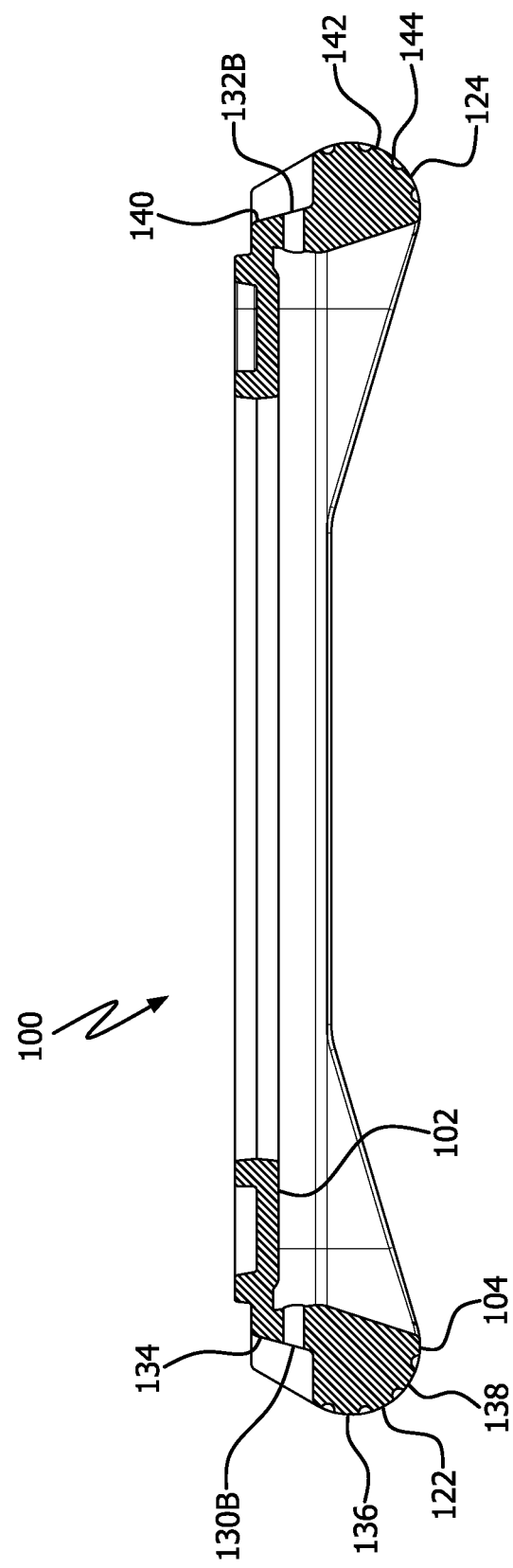
FIG. 7 is a section view of the license plate frame taken along line 7-7 of FIG. 1.

With specific reference to FIGS. 5 and 7, the first wall 122 includes a first inner portion 134 connected to the base portion 102 and a first outer portion 136 connected to the first inner portion 134 opposite the base portion 102. The first outer portion 136 is configured to contact other objects when the license plate frame 100 acts as a bumper. As illustrated in FIG. 7, the first outer portion 136 has a relatively large cross-sectional area compared to the first inner portion 134. A first outer contact surface 138 of the first outer portion 136 illustratively has a curved shape, although the outer contact surface 138 may alternatively have a non-curved shape.

With continued reference to FIGS. 5 and 7, the first inner portion 134 illustratively includes three compression openings 130, more specifically a first compression opening 130A (also referred to as an upper compression opening), a second compression opening 130B (also referred to as an intermediate compression opening), and a third compression opening 130C (also referred to as a lower compression opening). Alternatively, the first inner portion 134 may have a different number of compression openings 130. The compression openings 130 are illustratively formed in a linear arrangement. Alternatively, the compression openings 130 may be provided in different arrangements. The compression openings 130 are illustratively formed as ovals elongated along the first wall 122. Alternatively, one or more of the compression openings 130 may be provided with different shapes. The compression openings 130 are illustratively formed as through openings. Alternatively, one or more of the compression openings 130 may be provided as a different type of opening, such as a blind opening or pocket. The compression openings 130 each have a height (that is, a dimension aligned with the vertical direction of FIG. 5) that is less than the overall height of the first wall 122. The compression openings 130 each have a width (that is, a dimension aligned with the horizontal direction of FIG. 5) that is less than the overall width of the first wall 122. The compression openings 130 have an overall height (that is, a dimension from the top of the first compression opening 130A to the bottom of the third compression opening 130C) that is less than the overall height of the first wall 122

With specific reference to FIGS. 6 and 7, the second wall 124 includes a second inner portion 140 connected to the base portion 102 and a second outer portion 142 connected to the second inner portion 140 opposite the base portion 102. The second outer portion 142 is configured to contact other objects when the license plate frame 100 acts as a bumper. As illustrated in FIG. 7, the second outer portion 142 has a relatively large cross-sectional area compared to the second inner portion 140. A second outer contact surface 144 of the second outer portion 142 illustratively has a curved shape, although the outer contact surface 144 may alternatively have a non-curved shape.

With continued reference to FIGS. 6 and 7, the second inner portion 140 illustratively includes three compression openings 132, more specifically a fourth compression opening 132A (also referred to as an upper compression opening), a fifth compression opening 132B (also referred to as an intermediate compression opening), and a sixth compression opening 132C (also referred to as a lower compression opening). Alternatively, the second inner portion 140 may have a different number of compression openings 132. The compression openings 132 are illustratively formed in a linear arrangement. Alternatively, the compression openings 132 may be provided in different arrangements. The compression openings 132 are illustratively formed as ovals elongated along the second wall 124. Alternatively, one or more of the compression openings 132 may be provided with different shapes. The compression openings 132 are illustratively formed as through openings. Alternatively, one or more of the compression openings 132 may be provided as a different type of opening, such as a blind opening or pocket. The compression openings 132 each have a height (that is, a dimension aligned with the vertical direction of FIG. 6) that is less than the overall height of the second wall 124. The compression openings 132 each have a width (that is, a dimension aligned with the horizontal direction of FIG. 6) that is less than the overall width of the second wall 124. The compression openings 132 have an overall height (that is, a dimension from the top of the fourth compression opening 132A to the bottom of the sixth compression opening 132C) that is less than the overall height of the second wall 124.

While an exemplary embodiment has been illustrated, it is understood that the present disclosure is not limited thereto. The embodiment may be changed, modified and further applied by those skilled in the art. Therefore, the present disclosure is not limited to the details shown and described, but also includes all such changes and modifications.

What is claimed is:

1. A license plate frame comprising:
   a base portion comprising a plurality of fastener openings, each of the plurality of fastener openings configured to receive a fastener for securing the license plate frame and a license plate to a vehicle; and
   a perimeter portion connected to and extending outwardly from the base portion, the perimeter portion comprising a plurality of walls, the plurality of walls comprising a first wall, and the first wall comprising a first side, a second side, and at least one compression opening, the compression opening being a through opening, and the through opening being open on both the first side and the second side of the first wall.

2. The license plate frame of claim 1, wherein the first wall is a first sidewall.

3. The license plate frame of claim 2, wherein the compression opening is a first compression opening, and the plurality of walls further comprises a second wall, the second wall comprising at least a second compression opening.

4. The license plate frame of claim 1, wherein the compression opening has a height less than an overall height of the first wall.

5. The license plate frame of claim 1, wherein the compression opening has a width less than an overall width of the first wall.

6. The license plate frame of claim 1, wherein the first wall further comprises at least a second compression opening.

7. The license plate frame of claim 6, wherein the through opening is a first through opening, the second compression opening is a second through opening, and the second through opening is open on both the first side and the second side of the first wall.

8. The license plate frame of claim 1, wherein the first wall comprises:
   an outer portion; and
   an inner portion connecting the outer portion to the base portion, the inner portion comprising the compression opening.

9. The license plate frame of claim 1, wherein the first side of the first wall is an inner side, and the second side of the first wall is an outer side.

10. The license plate frame of claim 1, wherein the through opening extends perpendicularly relative to the plurality of fastener openings.

11. A license plate frame comprising:
   a base portion comprising a plurality of fastener openings, each of the plurality of fastener openings configured to receive a fastener for securing the license plate frame and a license plate to a vehicle; and
   a perimeter portion connected to and extending outwardly from the base portion, the perimeter portion comprising a plurality of walls, the plurality of walls comprising:
      a first sidewall comprising a first side, a second side, and at least one first sidewall compression opening, the first sidewall compression opening being a through opening, and the through opening being open on both the first side and the second side of the first sidewall;
      a second sidewall comprising at least one second sidewall compression opening;
      a lower wall extending between the first sidewall and the second sidewall; and
      an upper wall extending between the first sidewall and the second sidewall.

12. The license plate frame of claim 11, wherein the first sidewall comprises:
   a first outer portion; and
   a first inner portion connecting the first outer portion to the base portion, the first inner portion comprising the first sidewall compression opening.

13. The license plate frame of claim 12, wherein the second sidewall comprises:
   a second outer portion; and
   a second inner portion connecting the second outer portion to the base portion, the second inner portion comprising the second sidewall compression opening.

14. The license plate frame of claim 11, wherein the through opening is a first through opening, and the second sidewall compression opening is a second through opening.

15. The license plate frame of claim 11, wherein the first side of the first sidewall is an inner side, and the second side of the first sidewall is an outer side.

16. The license plate frame of claim 11, wherein the through opening extends perpendicularly relative to the plurality of fastener openings.

\* \* \* \* \*